United States Patent [19]

Marx

[11] 3,980,571

[45] Sept. 14, 1976

[54] SYNTHETIC LUBRICANT FOR MACHINING AND CHIPLESS DEFORMATION OF METALS

[76] Inventor: Joachim Marx, Schwerinstrasse 34, Mulheim (Ruhr)-Styrum, Germany

[22] Filed: Feb. 16, 1973

[21] Appl. No.: 333,426

Related U.S. Application Data

[63] Continuation of Ser. No. 47,209, June 18, 1970, abandoned.

[52] U.S. Cl. ............................. 252/32.5; 252/49.3; 252/49.5; 252/51.5 R
[51] Int. Cl.² ......................................... C10M 1/44
[58] Field of Search ............... 252/49.3, 49.5, 52 D, 252/389 A, 32.5, 51.5 R, 52 A; 260/615 B

[56] References Cited
UNITED STATES PATENTS

| | | | |
|---|---|---|---|
| 2,425,845 | 8/1947 | Toussaint et al. | 260/615 B |
| 2,868,671 | 1/1959 | Henricks | 252/49.3 X |
| 3,022,335 | 2/1962 | Lundsted | 260/615 B |
| 3,256,211 | 6/1966 | Bailey et al. | 252/49.3 |
| 3,310,489 | 3/1967 | Davis | 252/49.3 X |
| 3,313,728 | 4/1967 | Glasson et al. | 252/49.3 X |
| 3,320,164 | 5/1967 | Brunel | 252/32.5 X |
| 3,346,495 | 10/1967 | Malec | 252/49.3 X |
| 3,496,104 | 2/1970 | Shimada et al. | 252/32.5 |
| 3,526,596 | 9/1970 | Kress et al. | 252/52 A X |

FOREIGN PATENTS OR APPLICATIONS

| | | |
|---|---|---|
| 818,758 | 8/1959 | United Kingdom |

OTHER PUBLICATIONS

Schick "Nonionic Surfactants" (1967) pp. 309–313 & 991.

*Primary Examiner*—Delbert E. Gantz
*Assistant Examiner*—Andrew H. Metz
*Attorney, Agent, or Firm*—Weiser, Stapler & Spivak

[57] ABSTRACT

Lubricants for machining, deformation of machining and cold rolling of metals. The lubricant comprises an aqueous solution of at least one of the copolymers of ethylene oxide and higher alkylene oxides having 3 to 8 carbon atoms, of the copolymers of an acrylic acid or methacrylic acid and an acrylic ester, or a polymer of polyvinylpyrrolidone and/or of polyvinyl alcohol. The lubricants are useful in any operation involving the working of metals like steel, copper and the like. They have remarkable load-bearing capacity, and are biodegradable.

9 Claims, 1 Drawing Figure

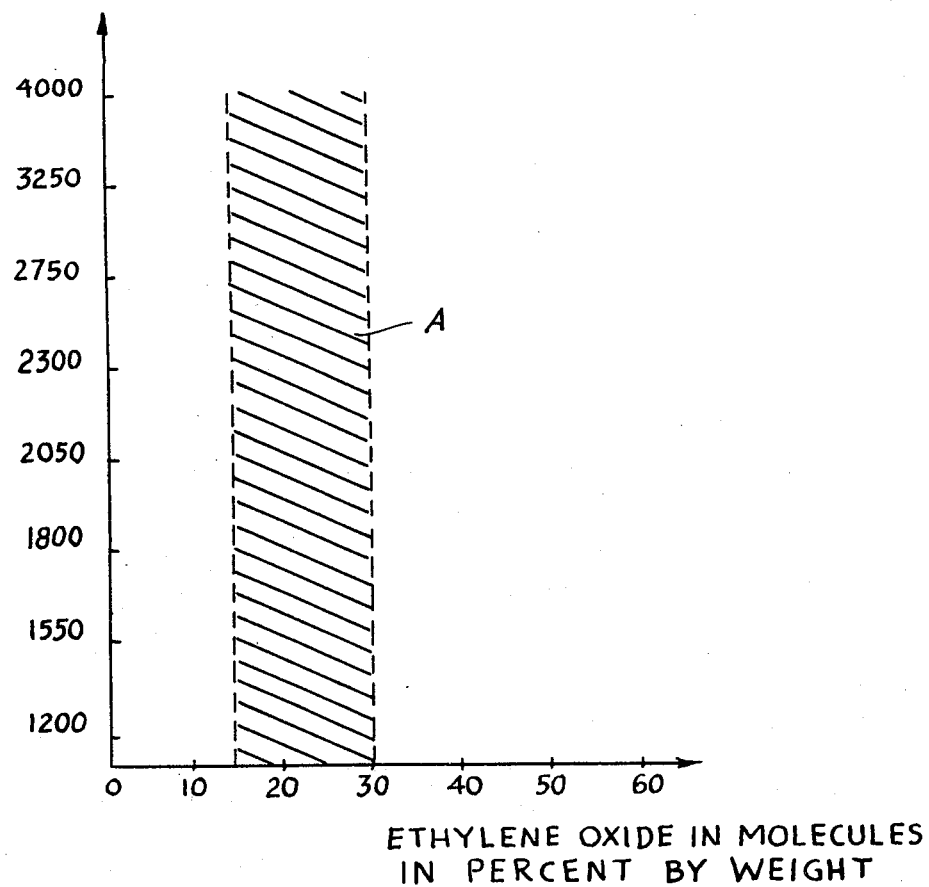

SYNTHETIC LUBRICANT FOR MACHINING AND CHIPLESS DEFORMATION OF METALS

This is a continuation of application Ser. No. 47,209, filed June 18, 1970, and now abandoned.

The invention concerns a synthetic lubricant or metal working fluid for working, deforming or machining of metals in which the process can be free of chips or metal turnings or can yield such chips or turnings. More specifically, the invention concerns chain-like, high molecular weight lubricants for metal working, which may be used in many applications as aqueous solutions of concentrations which can vary considerably and which can also be very dilute.

Lubricants, to be useful for the working or shaping of metallic materials, must be capable of carrying away as fast as possible the heat energy generated in the tool in the course of its working and/or in the work piece. In the case of chip-less deformation operations, the lubricants must be capable of reducing the friction between the tool and the work piece worked on. The places at which direct contact occurs between the tool and the work piece, the so-called lubrication gap, must be separated from each other by the liquid lubricant. A ideal or complete separation is not possible and is indeed not desired, because in the course of the working of the work piece direct contact between the working tool or the other surface which is in frictional engagement with the work piece is required. In cold rolling for instance, such a frictional engagement between the two surfaces must prevail so that the work piece will move or advance rather than slip and remain stationary during the working thereof. In drilling and boring the advancing point or cutting surface or edge of the tool operates under essentially dry, non-lubricated, conditions; whereas it is the portion of the tool which follows which is under lubricating conditions. Moreover, in the case of lubricating bearings, good lubrication is achieved, if the lubricant, which is subjected to high pressure in the lubrication gap, is capable of withstanding this pressure. The capacity of a lubricant to withstand pressure is an important consideration in the success of the operation.

Another important consideration is the behavior of the lubricant under heat which is generated by the conversion of the frictional movement of the work pieces. The viscosity of oil or oil-containing lubricants decreases with increasing temperature, which in turn affects detrimentally the lubricating properties because a lesser amount of these thinner oils tends to be present in the space between the work pieces to absorb the pressure and provide the necessary film for separation between the work pieces.

Originally, there has been used as lubricants for metal working and machining pure oils and fats. However, these materials have in general an insufficient capacity for transferring the heat away from the working environment. These materials were therefore replaced in many applications by emulsions, especially by aqueous emulsions. These emulsions are mostly oil-in-water emulsions, which have a better cooling efficiency and which are generally employed in those cases where high speed working in mass production requires carrying away of large quantities of heat per time unit.

For machining, certain high molecular materials, like polymers of ethylene oxide with fatty alcohols, fatty acids, amines or glycols have been proposed. However, these materials are used only as such and not in aqueous solution.

Likewise, lubricants have been proposed which contain 60 to 80% fatty acid esters, e.g., in form of a methyl, glycol or glycerol ester of natural fatty acids with 40 to 20% emulsifier in 2 to 5% aqueous solution. These emulsions are generally suitable for applications as lubricants in the so-called light working of metals, i.e. in working where as a result of moderate forwarding speed and moderate take-off rates per time unit, the tools are subjected to only moderate loads. Generally, in these cases there is no need to consider in the formulation of the lubricant composition, the formation of a residue upon annealing by heat treatment, because generally the finished machined articles and work pieces are not annealed. Moreover, the above described water-soluble lubricant compositions are presently often used for drilling and especially grinding. For heavier working, such as the cutting of inside thread, deep hole drilling or honing, modified oils, the so-called "alloyed oils", are generally exclusively used. The oils are primarily refined mineral oils having a viscosity of 2° to 25° Engler (E) at 20° C and contain various high pressure additives, such as organic sulfur and nitrogen compounds or chlorinated hydrocarbons. These additives are present generally in a quantity from 0.2 to 7% by weight based on the oil.

Lubricant compositions used in the past for the chipless shaping or deformation of metals comprise e.g. 80 to 90% refined mineral oil of 3° to 15° Engler, 10 to 20% emulsifier in form of fatty acids, fatty alcohols, fatty acid alcohol sulfonates, fatty acid amines, oxethylates or the like as well as 0.5 to 5% of additives improving the pressure characteristics, such as fatty acids or amines. The lubricants usually used for chip-less metal working and deformation and mostly oil-in-water emulsions having an oil content of about 3 to 7%. They represent a compromise between the lubricating effectiveness of the oil and the cooling effectiveness of the water.

In the selection of a lubricant for the various applications, there should be considered, besides the lubricating effect and the cooling effect, also its flow characteristics. For cold working, there must be considered also the ability to protect against corrosion and the absence of a residue after annealing, the resistance against aging and the stability with respect to biological degradation.

The flow characteristics, especially the minimum viscosity, are dependent on the size and form of the molecule in addition to the temperature, as discussed above. Preferably, the molecule of the lubricant compound should be coiled as little as possible and be built to be wide open and bulky with side chains or other space filling groups, such as hydrocarbon or heterocyclic groups. Such materials are relatively highly viscous even in high dilution, resistant to compression, and therefore have an especially favorable capacity for withstanding high pressure.

From a review of the various factors influencing the properties of lubricants in metal working it is apparent that it is very difficult, albeit impossible to forsee the behavior of a particular lubricant in a particular application and that conventional lubricants in use now which are suitable for one type of application are not necessarily so for another application. For instance, wherever presently oils are used, the water-type oil emulsion is not generally suitable and vice-versa.

It is therefore an object of the invention to provide new synthetic lubricants for metal working, which are superior to the known lubricants with respect to the requirements set out hereinbefore and other requirements to be set out hereinafter.

It is another object of the invention to provide a lubricant, which has very good lubricating effect and at the same time a cooling effect, and which is also stable, biologically degradable and does not noticeably age, hence can be used repeatedly.

Other objects of the invention will become apparent from the following description and from the drawing.

The lubricants of the invention are useful in any working or operation involving a metal, which working can generally be divided into two groups: those in which the metal is deformed, generally under pressure without cutting or drilling or the like, that is a chip-less operation hence an operation wherein no metal pieces are cut from the work piece, and operations wherein pieces of metal are cut or separated from the work piece.

FIG. 1 in the drawings is a diagrammatical representation of the composition of the preferred high polymeric material in relation to the molecular weight.

The lubricants of the invention are remarkably efficient and useful in any process which comprises bringing in frictional contact at least two surfaces, at least one of which is a metal surface, which are displaceable with respect to each other, in the presence of the lubricant of the invention. One of the metal surfaces can be stationary with respect to the other or two or more surafaces can be in movement relative to each other.

The new lubricant of the invention is useful for any metal working like deformation or cutting especially for use in cold working of metals, i.e. in chip-less operations and in machining or chip-producing operations, such as cold rolling, drawing, deformation or shaping of steel or non-ferrous metals by compression, and also for drilling, especially deep hole drilling or boring, honing, grinding, turning on the lathe and the like, cutting, scaling off, milling and rubbing of steel and of non-ferrous metals or the like.

The objects of the invention are achieved by a lubricant for chip-less deformation or shaping of metallic materials comprising at least one water soluble, high molecular weight linear polymer carrying side chains, the polymer being selected from the group consisting of copolymers of ethylene oxide and higher alkylene oxides having 3 to 8 carbon atoms, said ethylene oxide copolymers having from about 100 to about 500 monomer units in the chain; or copolymers of an acrylic acid and acrylic esters of alcohols having from about 1 to 12 carbon atoms or more, said acrylic copolymers having from about 100 to about 500 monomer units in the chain; or polyvinylpyrrolidone having a molecular weight from about 100,000 to about 1,000,000; and polyvinyl alcohol having a molecular weight higher than 10,000. The monomer may carry any side-chain, as is known, such as alkyl, alkylene, cycloalkylene, aryl, like styrene or other hydrocarbons which may be substituted by other atoms, or the side-chains may be hydroxyl, ether, ester, phosphates or other like groups. Generally the number of atoms of each side-chain does not exceed 12 atoms. Often the side-chains are hydrocarbons, like alkyl, especially lower alkyl, like methryl. The simplest illustration is polypropylene oxide or polymethyl methacrylete with their methyl group.

The new lubricants may be stored and used as a concentrate, which may contain water in an amount of about 4 parts or less by weight for one part of the high molecular weight linear polymer component. The preferred concentrates are those which comprise in homogeneous aqueous solution at least 20% by weight of the high molecular weight water-soluble polymer; the concentration though may be of about 90%.

For most economical application, the lubricant is in many instances preferably applied in form of a dilute homogeneous solution comprising from 0.1 to 5%, more advantageously from 0.5 to 10% and most beneficially from about 1 to 2% by weight of the high polymeric water soluble substance or a mixture thereof.

Advantageously, the lubricant contains a material which is capable of inhibiting corrosion of the metallic material to be worked and especially the rusting of ferrous materials. For many applications the lubricant comprises therefore in addition a phosphate or benzoate of an ethanolamine, most advantageously in an amount ranging from 0.1 to 2% and most preferably from 0.5 to 1% by weight based on the composition. The most preferred phosphates are diethanolamine phosphate or triethanolamine phosphate. Further useful additives are one or more of benzoic acid, triethanolamine and/or morpholine.

The preferred lubricant of the invention comprises a homogeneous aqueous solution of a linear, side chain-carrying copolymer of ethylene oxide with higher alkylene oxides having from 3 to 8 carbon atoms, or of a copolymer of acrylic acid or methacrylic acid with acrylic or methacrylic esters. Any ester is suitable providing the polymer is watersoluble. If desired, the lubricant contains the corrosion inhibitors and other lubricant additives.

The lubricant of the invention is water soluble. It can be used in concentrations as low as 0.5% or as high as about 90%. Generally the lubricant is employed as a 0.5 to 10% solution and preferably 1 to 2% aqueous solution of the polymeric material. In applications where there occurs considerable pressure the higher concentrations are preferable.

In another embodiment of the invention the copolymers of ethylene oxide and the copolymers of acrylic acid or methacrylic or their esters described are employed, in conjunction with polyvinylpyrrolidone in a concentration of from 0.1 to 5%, or with polyvinylalcohol having a molecular weight greater than about 5,000 or preferably 10,000 likewise in a concentration of from 0.1 to 5%. Polyvinylpyrrolidone or polyvinyl alcohol are also suitable to be used alone as the lubricant of the invention, as such, or more preferably in dilute aqueous solution of about 0.5 to 5%. The polymers used have a molecular weight in the range of about 30,000 to about 1,000,000, or higher.

Suitable corrosion or rust preventives are additives such as the phosphates and/or benzoates of ethanolamines. Most preferably there are used especially ethanolamine hydrogen phosphate or triethanolamine phosphate, since these compounds have a neutral reaction in organic or aqueous solutions. They are especially suited for those lubricants, for which is required a load carrying capacity of up to 150 kg.

Other suitable corrosion and rust inhibitors are benzoic acid, triethanolamine. Morpholine may be added as a gas phase inhibitor. The corrosion and rust inhibitors are preferably added in a concentration of from 0.1 to 2% and most advantageously of 0.5 to 1% to the dilute aqueous lubricant of the invention.

The viscosity of the aqueous solution of the high polymeric material may be controlled by the proper selection of the chain length of the polymer used. Generally, the viscosity characteristics of the polymeric materials used in the lubricants of the invention are very favorable, the curves of the indicia of viscosity being remarkably flat.

The polymers used in accordance with the invention should preferably have a cloud point, in a 1% aqueous solution not lower than 30° C. Another criterion is their viscosity. Generally, a 5% aqueous solution should not have a viscosity exceeding 50 centipoises at 20° C.

The components making up the copolymers, which are used in the lubricants of the invention, should have a preferred ratio, which is dependent on the molecular weight. In the diagram in FIG. 1, there is shown the relationship of the molecular weight of the propylene oxide polymer to the amount of ethylene oxide in the molecule, in percent by weight. The polymers compositions, falling into the shaded area A in FIG. 1 are one type of polymer especially well suited for use as the lubricants of the invention. A copolymer (a block polymer) of this kind may be produced, for instance, by starting from a polypropylene oxide having a molecular weight of 800 and polymerizing in the presence of ethylene oxide to increase the molecular weight to 1200.

A 1% aqueous solution of the materials of the invention made in the above described manner, possess as compared with the known lubricants and emulsions used for the same metal working purposes, a considerably improved load carrying capacity. In addition thereto, they have various important advantages, particularly their property of being biologically degradable so that they fill the requirements of water pollution control.

Furthermore, they leave no residue whatever on the work piece after annealing by heating, which is a very important advantage and benefit in the case of work pieces processed by chip-less deformation. In the deformation operation proper, they are distinguished by an especially high capacity for load carrying. In the case of rolling, the number of runs for achieving a desired degree of reduction may be considerably lowered, at considerably reduced power requirements. They have a superior cooling effect, so that the work speed can be increased. This makes them, generally speaking, applicable for the most varied types of working, ranging from a light deformation to heavy rolling. In the case of chip or turnings producing working or machining it was found, that the wear of the tools is very considerably lowered. An improvement by 100% is not unusual; often reductions of the tool wear by several hundred percent is achieved as compared with the commonly used drilling and cooling compositions. This is especially remarkable and unexpected, because these important improvements are observed particularly in heavy working operations.

In connection with cold forming, especially of ferrous metals and particularly sheets in large volume, the economical recovery of the lubricants has always been a real problem. Because of unacceptable water pollution, it is not possible to simply dump the coolants, used herebefore, ito the rivers, not to mention the considerable commercial and economical losses which would result from such a practice. Therefore, herebefore costly regeneration equipment and recovery operations were required. In contrast, the lubricants of the present invention may be fed (as their highly dilute solutions) without any problem into the rivers. The high molecular materials contained in the lubricants of the invention are biodegradable. The economical losses caused by the discarding of the materials into the rivers are very small because of the small percentage which these high molecular materials constitute in the dilute lubricants. Regenerative processing of the lubricants of the invention with regard to and for the recovery of the high molecular materials is therefore not required, though it may be considered, if the recovery of the water for reasons of water economy would make it necessary.

The lubricants of the invention are, in the absence of water, highly viscous oils or hard wax-like materials. In aqueous solution they possess a very high viscosity, the degree of which is determined at least in part by the chain length and by the molecular weight of the high molecular polymeric component. Generally, it is desirable to limit the chain length of the high polymeric material used in the lubricants of the invention, in view of the rapidly increasing viscosity with increasing molecular weight, from about 50 units to about 500 units of the monomer radicals in the chain. This corresponds, in the case of the copolymers of polypropylene oxide and polyethylene oxide to a molecular weight of about 1000 to 6000 and to molecular weights of about 30,000 to about 1,000,000 in the case of polyvinylpyrrolidone, or polyvinylalcohol.

Another advantage of the lubricants of the invention is that the aqueous solutions retain their excellent viscosity - temperature relationship at temperatures ranging from 10° to 80° C, or higher. The solutions are also stable and remarkably resistant to aging. The excellent load carrying capacity of tHe new lubricants of the invention as compared with the herebefore commonly used lubricants for the same purpose is clearly evident from the following table. The solids content of the aqueous lubricants of the invention is in this comparison generally of the order of about 1%. The load carrying data given herein are measured in the so-called four-balls apparatus (Shell Co.) standard test with a running time of 1 minute.

TABLE

| Lubricant | | Load carrying capacity |
|---|---|---|
| Mineral oil, 5° Engler at 20° C | (prior art) | 90 kg |
| Rape oil, pure | (prior art) | 160 kg |
| Emulsion A, 5% Mineral oil basis: Mineral oil 5° Engler plus 15% emulsifier "Emulsogen" (BASF). | (prior art) | 80 kg |
| Emulsion B, 5% fatty oil basis: Stearic acid methylester plus 15% emulsifier "Emulsogen EL" (BASF) | (prior art) | 100 kg |
| Pluracol (Wyandotte Chemical Corp.) | | 140 kg |
| Aqueous solution of 1% copolymer on basis of polypropylene/polyethylene oxide, molecular weight 8000. | (invention) | 160 kg |
| Aqueous solution of 1% copolymer on basis polypropylene oxide/ polyvinylpyrrolidone, molecular weight 40,000 | (invention) | 250 kg |

It is to be noted that in the lubricants of the invention shown in the foregoing table, the ratios of the molecular weights of the copolymerized components have been held within the limits set out in FIG. 1 of the drawings.

The load bearing capacity has been determined by a standard method at a running time of one minute for all compositions of the table as described hereinbefore. Rape oil is often used as the standard material for the evaluation of lubricants.

As has been set out above, it is known to use emulsions as the coolants and lubricants for machining at low loads or of easily machinable materials (tensile strength up to about 75 kg/mm$^2$). It has been found, that the high molecular weight lubricants of the invention, because of their high load carrying ability and the reduction in tool wear resulting therefrom, can fully replace the customary emulsions. Furthermore, at a concentration of about 2% in water, considerable advantages are realized. The cutting speeds customarily achievable with emulsions can be increased by 20 to 50% and at the same time the tool wear is reduced by at least 50%. It is to be noted thereby, that the maximum absolute cutting speeds are strongly dependent on the materials involved. In the case of sawing, planing, scaling of e.g. tubing and wire, the wear reductions of the tools are generally over 100%.

The superior effectiveness of the invention becomes especially clearly evident from a comparison of the following maximum cutting speeds obtainable in the case of drilling. When a steel of a hardness classification ST 37 is drilled with the customary emulsions, a maximum cutting speed of 30 to 40 meters per minute can be achieved. Using for the same purpose, under identical conditions, the lubricants of the invention in about 1% aqueous solution of the high molecular material, cutting speeds of 40 to 65 meter per minute are readily achieved. For the considerably harder steel of classification St 50, the corresponding values for lubrication by emulsions are at 8 to 15 meters per minute and for lubrication with the lubricants of the invention at 20 to 35 meters per minute.

In the case of heavy duty cutting tasks, as with materials having a tensile strength above 90 kg/mm$^2$ and at high loads, as they are customary in the case of deep hole drilling of e.g. steel of the classification St 50 at cutting speeds of above 100 meters per minute, only highly modified oils have been used in the past as the lubricant and coolant. The high molecular lubricants of the invention can also be used in this type of operation with great success. Even at the same work performance (tool wear, cutting speed, surface quality) the advantage of the new lubricants of the invention is marked, since, at assumed equal cost of the actual lubricating compound per kg, the actual cost in practical operation amounts to only 5 to 10% in the case of the new high molecular material because of their use in great dilution in the lubricants of the invention.

However, if desired, the lubricants of the invention may be used in concentrated form or in a dilution with water to e.g. a concentration of 15 to 25% for deep drawing of steel or stainless steel parts and for drawing of wire and tubing. A particular advantage of the lubricants of the invention is thereby, that, particularly in the case of deep drawing, the residues of the lubricant formed on the work piece can be readily washed off with water, so that efficient further processing of the work pieces is made possible.

Aside from the various advantages of processing and operation achieved by the new lubricants of the invention, as set out hereinbefore, the cost factor is very important. For example, a deep drilling machine requires for a certain output, for instance, 3000 kg highly modified or alloyed oil, as it has been used herebefore in this type of machine. This means a capital outlay of about forty thousand dollars ($40,000.). If there is used in this machine the highly dilute solutions of the high molecular materials in accordance with the invention instead of the modified oil, a capital outlay of only one-tenth is required. Aside from the very considerably lower cost, tool wear is reduced, as a result of the good cooling efficiency, and in addition the cutting speed may be increased by about 10 to 25%. Still higher increases of the cutting speeds are theoretically possible with the new lubricants of the invention, but practical limits are imposed by the design of the existing machines.

The lubricants of the invention are useful in the working of any metal like steel, brass, aluminum, titanium tantalium, uranium, copper, alloys of various metals thereof.

The invention is further illustrated by the following examples, all parts being parts by weight and percentages being percent by weight. The examples are not intended as being a limit to the scope of the invention.

EXAMPLE 1

A concentrate was prepared by mixing 15 parts of a copolymer of polypropyleneoxide and polyethyleneoxide having a molecular weight of about 2000 based on polypropylene basis, 5 parts of a copolymer of polypropyleneoxide and polyethylene oxide, having a molecular weight of about 8000 based on the polypropylene weight, 6 parts of a corrosion inhibitor, such as morpholine (or triethanolamine), and 74 parts of water. 5 parts of the concentrate were diluted with water to form 100 parts of the lubricant composition, which contained 0.75% of the lower molecular weight and 0.25% of the higher molecular weight copolymer as the lubricant.

Steel was rolled in conventional manner with the use of this lubricant composition. Excellent results were obtained in very economical manner.

Likewise, the lubricant was used in copper, and brass forming into sheets.

EXAMPLE 2

A concentrate was prepared by mixing 15 parts of a copolymer of propylene oxide and ethylene oxide, having a molecular weight of about 3000, 5 parts polyvinylpyrrolidone having a molecular weight of about 20,000, 6 parts of morpholine (or triethanolamine) and 74 parts of water. 5 parts of the concentrate were diluted with water to form 100 parts of the finished lubricant composition.

This composition was used as the lubricant in the conventional rolling of copper rails with very good results.

Noteworthy is that with the lubricant of the invention new materials and new shapes are made possible. For instance especially thin foils are made by rolling to foils of 5 microns of copper or tin or gold or brass, 30 microns of steel (siliconised steel).

EXAMPLE 3

A concentrate was prepared by mixing 70 parts of water, 5 parts of morpholine (or triethanolamine), 20 parts of a copolymer of polypropylene oxide and polyethylene oxide having a molecular weight of about 3000, and 2 parts of polyvinylpyrrolidone having a molecular weight of about 1,000,000. There were diluted 2.5 parts of the concentrate with water to form 100 parts of the finished lubricant composition, which was used for rolling aluminum sheets in conventional manner at high rolling speeds with excellent results. The spent lubricant composition was not worked up or regenerated but led directly into the sewer system.

EXAMPLE 4

A concentrate was prepared by mixing 20 parts of a copolymer of styrene oxide and ethylene oxide, having a molecular weight of about 10,000, 16 parts benzoic acid, 9 parts triethanolamine, 16 parts triethanolaminephosphate, 6 parts morpholine and 34 parts of water. 5 parts of the concentrate were diluted with water to form 100 parts of the lubricant composition, which was used as the lubricant and coolant for drilling steel. The load carrying property of the lubricant composition was determined to be 300 kg at one minute running time. With this lubricant, an improvement of about 30 to 50% over a conventional lubricant is achieved. The lubricant was also useful in the working of extremely hard metal alloys.

EXAMPLE 5

A concentrate was prepared by mixing 20 parts of a copolymer from cyclohexyl oxide and ethylene oxide, having a molecular weight of about 12,000, 5 parts of a copolymer from propylene oxide and ethylene oxide having a molecular weight of about 2000, 5 parts of polyvinylpyrrolidone having a molecular weight of 30,000, 16 parts of benzoic acid, 9 parts of triethanolamine, 15 parts of triethanolamine phosphate, 6 parts of morpholine and 24 parts of water. 5 parts of the concentrate were diluted with water to form 100 parts of a lubricant composition, which was used for dirlling steel.

The load carrying capacity of this lubricant composition was determined to be 380 to 400 kg, at a running time of one minute. Cutting speeds of 60 meters per minute could be achieved in the case of steel of the classification St 37 and cutting speeds of 30 meters per minute in the case of steel of the classification St 50. The lubricant is capable of withstanding the heavy pressures which come about in deep hole boring, such as occur in the production of riffles. Another useful application of the lubricant is on the honing of metals to surfaces having a particular high gloss.

EXAMPLE 6

A concentrate was prepared by mixing 15 parts of a copolymer from propylene oxide and ethylene oxide, having a molecular weight of about 4400 and containing the propylene radicals and the ethylene radicals in a ratio of about 2.1 to 1, 5 parts of polyvinylpyrrolidone having a molecular weight of about 800,000, 10 parts of diethanolamine phosphate, 46 parts of the corrosion inhibitor mixture as set out in example 5 and 24 parts of water. 5 parts of this concentrate were diluted with water to form 100 parts of a lubricant composition, which was used with excellent results in steel shaping operations, like in the production of various shapes, like rails, rods, channels in rods and the like. Likewise, the composition is very useful in thread chassing or tapping.

EXAMPLE 7

A concentrate was prepared by mixing 20 parts of a water-soluble of copolymer of acrylic acid isopropyl ester and methacrylic acid as described in the German Patent 862–956, and having a molecular weight of 15,000, 15 parts of ethylene glycol, 46 parts of a corrosion inhibitor mixture as set out in example 5 and 29 parts of water. 3 parts of the concentrate were diluted with water to form 100 parts of a lubricant composition.

EXAMPLE 8

A concentrate was prepared by mixing 20 parts of a copolymer from propylene oxide and ethylene oxide, having a molecular weight of about 2500 and containing the propylene oxide and ethylene oxide monomers in a ratio of 1.8 to 1, 4 parts of polyvinyl alcohol having a molecular weight of about 10,000, 46 parts of the corrosion inhibitor mixture as set out in example 5 and 30 parts of water. 10 parts of the concentrate were diluted with water to form 100 parts of a lubricant composition.

The lubricant is especially well suited for planing steel, to metal sheet or in milling and cutting operations.

EXAMPLE 9

A concentrate was prepared by mixing 20 parts of a copolymer from propylene oxide and ethylene oxide, having a molecular weight of about 4400 and containing the propylene radicals and the ethylene radicals in a ratio of about 2.1 to 1, 5 parts of polyvinylpyrrolidone having a molecular weight of about 200,000, 15 parts diethanolamine phosphate, and 30 parts propylene glycol.

The lubricant is especially well suited for grinding steel and super-finishing of steel for manufacture of fine instruments.

EXAMPLE 10

A copolymer of ethylene oxide, butylene oxide (23 parts and 15 parts, respectively), propylene glycol (50 parts) and 2 parts of morpholine is mixed with 10 parts of water. This concentrate is useful in deep drawing of steel.

I claim:

1. An aqueous lubricant composition having improved properties in metal working as in metal deformation or cutting, capable of higher cutting speeds, higher load capacity and decreased tool wear, comprising an aqueous solution of from 0.1 to 90 weight percent of a mixture of a copolymer of ethylene oxide and a higher alkylene oxide having from 3 to 8 carbon atoms, said ethylene oxide copolymers having a molecular weight from about 1000 to about 6000 and wherein said copolymer contains at least about 15% of ethylene oxide and, from 0.1 to 5.0 weight percent of a polymeric additive selected from the group consisting of: polyvinyl pyrrolidinone having a molecular weight of from about 100,000 to about 1,000,000 polyvinyl alcohol, polyacrylates of alcohols of from 1 to 12 carbon atoms, polymethacrylates of alcohols of from 1 to 12 carbon atoms and copolymers of polyacrylates and polymethacrylates of alcohols of from 1 to 12 carbon atoms.

2. The lubricant of claim 1 which has a viscosity not exceeding 50 centipoises at 20°C.

3. The lubricant of claim 1 which has a cloud point not lower than 30°C, in a 1% aqueous solution.

4. The lubricant composition of claim 3 wherein said polymeric additive is a polyacrylate or polymethacrylate copolymer of from about 100 to 500 monomeric units in the chain.

5. The lubricant composition of claim 1 which is a solution of at least 0.2 percent by weight.

6. The lubricant composition of claim 1 wherein the copolymer contains not more than about 66 2/3% of the higher alkylene oxide and at least 15% of ethylene oxide.

7. An aqueous lubricant composition having improved properties in metal working as in metal deformation or cutting, capable of higher cutting speeds, higher load bearing capacity and decreased tool wear, comprising an aqueous solution of from 0.1 to 90 weight percent of a mixture of a copolymer of ethylene oxide and a higher alkylene oxide having from 3 to 8 carbon atoms, said ethylene oxide copolymers having a molecular weight from about 1000 to about 6000 and wherein said copolymer contains at least about 15% of ethylene oxide and, a polymeric additive selected from the group consisting of: from 0.1 to 5 weight percent of polyvinyl pyrrolidinone having a molecular weight from about 100,000 to about 1,000,000. from 0.1 to 5.0 weight percent of polyvinyl alcohol, 0.5 to 5.0 weight percent of a polyacrylate of alcohols of from 1 to 12 carbon atoms, 0.5 to 5.0 weight percent of a polymethacrylate of alcohols of from 1 to 12 carbon atoms and 0.5 to 5.0 weight percent of copolymers of polyacrylates and polymethacrylates of alcohols of from 1 to 12 carbon atoms, said composition further containing from 0.1 to 2.0 weight percent of a corrosion inhibitor selected from the group consisting of phosphates, benzoates and morpholine, wherein said phosphates or benzoates are the salts of di-or tri-ethanolamine.

8. The composition of claim 7 wherein said corrosion inhibitor is an ethanolamine phosphate.

9. The composition of claim 7 wherein said corrosion inhibitor is a neutral or basic phosphate or benzoate.

* * * * *